(12) United States Patent
Shibata

(10) Patent No.: US 9,694,313 B2
(45) Date of Patent: *Jul. 4, 2017

(54) COMPOSITE HOLLOW FIBER MEMBRANE AND HOLLOW FIBER MEMBRANE MODULE

(71) Applicant: Mitsubishi Rayon Co., Ltd., Chiyoda-ku (JP)

(72) Inventor: Noritaka Shibata, Toyohashi (JP)

(73) Assignee: Mitsubishi Rayon Co., Ltd., Chiyoda-ku (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/386,981

(22) PCT Filed: Mar. 29, 2013

(86) PCT No.: PCT/JP2013/059595
§ 371 (c)(1),
(2) Date: Sep. 22, 2014

(87) PCT Pub. No.: WO2013/147187
PCT Pub. Date: Oct. 3, 2013

(65) Prior Publication Data
US 2015/0059576 A1    Mar. 5, 2015

(30) Foreign Application Priority Data

Mar. 30, 2012 (JP) .................. 2012-080258

(51) Int. Cl.
*B01D 53/22* (2006.01)
*B01D 69/08* (2006.01)
*B01D 69/10* (2006.01)
*B01D 71/26* (2006.01)
*C08J 9/00* (2006.01)
*C08K 5/06* (2006.01)
*B01D 69/02* (2006.01)
*B01D 69/14* (2006.01)
*C08L 23/02* (2006.01)
*C08K 7/22* (2006.01)

(52) U.S. Cl.
CPC .......... *B01D 53/228* (2013.01); *B01D 69/02* (2013.01); *B01D 69/08* (2013.01); *B01D 69/10* (2013.01); *B01D 69/141* (2013.01); *B01D 71/26* (2013.01); *C08J 9/00* (2013.01); *C08K 5/06* (2013.01); *B01D 2323/02* (2013.01); *B01D 2325/027* (2013.01); *B01D 2325/36* (2013.01); *B01D 2325/38* (2013.01); *C08K 7/22* (2013.01); *C08L 23/02* (2013.01); *C08L 2203/12* (2013.01)

(58) Field of Classification Search
CPC ...... B01D 53/228; B01D 69/08; B01D 69/02; B01D 69/10; B01D 69/141; B01D 71/26; B01D 2323/02; B01D 2325/027; B01D 2325/36; B01D 2325/38; C08J 9/00; C08K 5/06; C08K 7/22; C08L 23/02; C08L 2203/12
See application file for complete search history.

(56) References Cited

U.S. PATENT DOCUMENTS

| 3,367,999 | A | * | 2/1968 | Steierman | C08L 23/06 264/132 |
|---|---|---|---|---|---|
| 5,254,143 | A | * | 10/1993 | Anazawa et al. | 95/46 |
| 5,373,972 | A | * | 12/1994 | Bystrom et al. | 222/212 |
| 6,225,388 | B1 | * | 5/2001 | Tsai | A61F 13/15252 428/401 |
| 7,851,179 | B2 | * | 12/2010 | Tanaka et al. | 435/34 |
| 2010/0068264 | A1 | * | 3/2010 | Alcantar | A61K 47/36 424/450 |
| 2010/0272980 | A1 | * | 10/2010 | Kowata | C08B 11/02 428/220 |
| 2013/0039871 | A1 | * | 2/2013 | Murata | 424/62 |
| 2013/0255498 | A1 | * | 10/2013 | Shibata | 96/10 |
| 2014/0335396 | A1 | * | 11/2014 | Onizawa et al. | 429/145 |

FOREIGN PATENT DOCUMENTS

| EP | 1 052 011 A1 | 11/2000 |
|---|---|---|
| EP | 1052011 A1 * | 11/2000 |
| JP | 58-58105 | 4/1983 |
| JP | 63-277251 | 11/1988 |
| JP | 6-96102 | 11/1994 |
| JP | 6-335623 | 12/1994 |
| JP | 10-28852 | 2/1998 |
| JP | 11-47565 | 2/1999 |

(Continued)

OTHER PUBLICATIONS

MT JP2009112896 May 2009 Shibata, Noritaka.*
MT JP2012030184 Feb. 2012 Kakizaki et al.*
"matrix" American Heritage Dictionary of the English Language, Fifth Edition. 2011 Houghton Mifflin Harcourt Publishing Company 1 pg <http://www.thefreedictionary.com/matrix>.*
International Search Report issued Jun. 11, 2013, in PCT/JP13/59595 filed Mar. 29, 2013, 2 pages.
U.S. Appl. No. 14/388,616, filed Sep. 26, 2014.
U.S. Appl. No. 14/386,981, filed Sep. 22, 2014.
Extended European Search Report issued Mar. 20, 2015 in Patent Application No. 13769353.7.

(Continued)

*Primary Examiner* — Anthony Shumate
(74) *Attorney, Agent, or Firm* — Oblon, McClelland, Maier & Neustadt, L.L.P.

(57) ABSTRACT

This composite hollow fiber membrane comprises a non-porous homogeneous layer which is gas-permeable and a porous support layer which supports said homogeneous layer, and is characterized in that the non-porous homogeneous layer is hydrophobic and the polyolefin resin constituting the porous support layer contains a hydrophilic additive. By this means, a composite hollow fiber membrane for use in degassing can be provided that is hydrophilic, has high water vapor permeability, and can solve the problem of gas permeability being reduced due to condensate in the porous substance.

11 Claims, No Drawings

(56) References Cited

FOREIGN PATENT DOCUMENTS

| | | | |
|---|---|---|---|
| JP | 2007-152238 | | 6/2007 |
| JP | 2008-272696 | | 11/2008 |
| JP | 2009-112896 A | | 5/2009 |
| JP | 2009112896 A | * | 5/2009 |
| JP | 2009-219997 | | 10/2009 |
| JP | 2010-155207 | | 7/2010 |
| JP | 2012-30184 A | | 2/2012 |
| JP | 2012030184 A | * | 2/2012 |

* cited by examiner

COMPOSITE HOLLOW FIBER MEMBRANE AND HOLLOW FIBER MEMBRANE MODULE

This application is a 371 of PCT/JP2013/059595 filed Mar. 29, 2013. Priority to Japanese patent application 2012-080258, filed Mar. 30, 2012, is claimed.

TECHNICAL FIELD

The present invention relates to a polyolefin-based degassing composite hollow fiber membrane for degassing a dissolved gas having a non-porous homogeneous layer with gas permeability that excels in water resistance, while having an outer surface consisting of pores having hydrophilicity.

BACKGROUND ART

In order to remove particulates, organic matter, metals, etc. from the surfaces of electronic materials such as silicon substrates for semiconductors, glass substrates for liquid crystals, quartz substrates for photomasks, etc., functional cleaning water prepared by dissolving a specific gas in ultrapure water by a gas dissolving device, and then further adding trace amounts of chemicals as necessary has come to be used in place of high concentration chemical solutions. As the specific gas used in the functional cleaning water, in addition to carbon dioxide gas, hydrogen gas, oxygen gas, ozone gas, there are also inert gases, etc. such as noble gases. Various methods of dissolving carbon dioxide gas and hydrogen gas are being considered.

In particular, carbonated water is being used in order to rinse a cleaned object surface without electrically charging the cleaned object or nozzle. In other words, when using ultrapure water in cleaning, due to the magnitude of the insulation property thereof, the cleaned object may be electrically charged due to the friction with the cleaner and, for example, such as in a case of there being a fine circuit pattern on the cleaned object, the circuit thereof may be damaged from this electric charge. Carbonated water with enhanced conductivity by dissolving carbon dioxide gas in ultrapure water is being used in order to prevent this.

As a production method of carbonated water, a technique of degassing dissolved gas in ultrapure water using a gas-permeable membrane module of gas-permeable hollow fiber membranes, and subsequently dissolving a predetermined gas using the gas-permeable membrane module is often being used.

As the gas-permeable hollow fiber membrane, a membrane prepared using linear low-density polyethylene as the raw material of the homogeneous layer is exemplified in Patent Document 1.

A gas-permeable hollow fiber membrane consisting of TPX (polymethylpentene, PMP) having a non-porous outer surface is exemplified in Patent Document 2.

In a gas separation application, when water vapor is contained in the gas that is the separation target thereof, the water vapor having permeated from the target liquid of degassing may condense at the porous support layer on the surface of the membrane to decrease the gas permeability, and thus periodic drainage of drain water or drying of the gas-permeable membrane by way of high-temperature gas has been required (Patent Document 5).

It has been demanded to balance conflicting abilities like moderate hydrophobicity for realizing affinity between mixed gas and the membrane surface, while on the other hand, hydrophilicity for the separation performance with relation to water vapor not to decline over time.

For example, as a non-porous gas separation membrane with high hydropholicity to water, an ethylene-vinyl alcohol-based polymer composite membrane for gas separation consisting of an ethylene-vinyl alcohol-based polymer and amine compound (Patent Document 3) has been exemplified.

In addition, as a method for realizing hydrophilicity at the membrane surface, a hydrophilization technique by way of surfactants has been exemplified (Patent Document 4).

Patent Document 1: Japanese Unexamined Patent Application, Publication No. H11-47565
Patent Document 2: Japanese Unexamined Patent Application, Publication No. 2010-155207
Patent Document 3: Japanese Examined Patent Application Publication No. H06-96102
Patent Document 4: Japanese Unexamined Patent Application, Publication No. S63-277251
Patent Document 5: Japanese Unexamined Patent Application, Publication No. 2009-219997

DISCLOSURE OP THE INVENTION

Problems to be Solved by the Invention

The linear low-density polyethylene described in Patent Document 1 has a low gas permeability coefficient; therefore, in order to obtain a permeability flow rate of dissolved gas that is useful upon practical use, it is necessary to establish as a very thin membrane at no more than 0.3 µm. However, when forming such a thin homogeneous layer, the mechanical strength declines, and further, pinholes tend to develop. In addition, in order to prevent leaks of the target water for degassing, the pore size of the porous support layer is very small and is hydrophobic; therefore, there has been a problem in that the gas permeability declines if water vapor condenses inside the pores.

The gas-permeable hollow fiber membrane described in Patent Document 2 cannot solve the problem of condensed water due to the water vapor permeability being high, despite the non-porous homogeneous layer itself having merits like easily swelling due to consisting of ethylene-vinyl alcohol-based polymer and amine compound, and thus easily adapting to water.

With the method of Patent Document 3, although a wettability effect is brought about for applying an aqueous solution or suspension containing a specific surfactant to the surface, there have been problems such as, not only not having durability, but also the surfactant remaining in the porous support layer, whereby the gas permeability declines.

With the method of Patent Document 4, due to the holes in the porous layer being plugged by solution when immersing in a solution of hydrophilic macromolecules and the polymer used in hydrophilization being an ethylene-vinyl alcohol copolymer, there have been problems in that the non-porous homogeneous layer surface is also coated, and the performance as a gas permeable membrane is lost from the magnitude of the gas barrier property of this polymer.

Means for Solving the Problems

As a means for solving the above-mentioned issues, the present invention provides the following composite hollow fiber membrane for degassing.

According to a first aspect of the present invention, a composite hollow fiber membrane includes: a non-porous homogeneous layer having gas permeability, and a porous support layer that supports the homogeneous layer, in which the non-porous homogeneous layer is hydrophobic, and a polyolefin-based resin constituting the porous support layer contains a hydrophilic additive.

According to a second aspect of the present invention, in the composite hollow fiber membrane as described in the first aspect, water absorption is at least 2% according to JIS K7029 test method.

According to a third aspect of the present invention, in the composite hollow fiber membrane as described in the first or second aspect, the hydrophilic additive contained in the polyolefin-based resin constituting the porous support layer is polyoxyethylene alkyl ether.

According to a fourth aspect of the present invention, in the composite hollow fiber membrane as described in any one of the first or third aspects, the hydrophilic additive contained in the polyolefin-based resin forming the porous support layer is represented by the formula R1-(OCH$_2$CH$_2$)x-OH, in which R1 is a linear or branched alkyl having a carbon number of 10 to 100, and x is 2 to 10.

According to a fifth aspect of the present invention, in the composite hollow fiber membrane as described in any one of the first or third aspects, the content of the hydrophilic additive in the polyolefin-based resin forming the porous support layer is 0.01 to 10% by mass relative to the mass of polyolefin-based resin.

According to a sixth aspect of the present invention, in the composite hollow fiber membrane as described in the fourth aspect, the content of the hydrophilic additive in the polyolefin-based resin forming the porous support layer is 0.025 to 5% by mass relative to the mass of polyolefin-based resin.

Effects of the Invention

According to the present invention, by raising the hydrophilicity of the porous support layer in a region sandwiching the non-porous homogeneous layer while maintaining the characteristics demanded in a composite hollow fiber membrane for gas dissolution (for degassing), it becomes possible to reduce the condensation of water at the porous support layer, thereby obtaining stable gas dissolution/degassing performance.

PREFERRED MODE FOR CARRYING OUT THE INVENTION (Composite Hollow Fiber Membrane)

A composite hollow fiber membrane of the present invention is a composite hollow fiber membrane having a non-porous homogeneous layer through which gas permeates, and a hydrophilic porous support layer supporting this homogeneous layer, i.e. a porous support layer having a hydrophilic additive.

(Hydrophilic Additive)

As a hydrophilic additive added to a polyolefin-based resin constituting the porous support layer used in the present invention, it is sufficient so long as being a compound having hydrophilicity, and it is preferably a solid or semisolid compound at room temperature that can make a master batch by melt blending in an extruder into the resin forming the base. The hydrophilic additive is preferably a compound known as a hydrophilic surfactant.

More specifically, as the hydrophilic surfactant, compounds appropriately selected from the group of nonionic surfactants such as fatty acid glycerides, alkoxylated alkylphenols, polyoxyalkylene fatty acid esters, alkyl polyoxyethylene alcohols, polyoxyethylene alkyl ethers and fatty acid amides; the group of surfactants such as fatty acid salts, alkyl sulfate ester salt, alkyl benzene sulfonate, alkylnaphthalene sulfonate, dialkylsulfo succinate and special anions; and the group of block copolymers having a hydrophobic segment such as polyethylene glycol, copolymer of vinyl alcohol and ethylene and polyether block amide copolymer and a hydrophilic segment with more repeating units than this hydrophobic segment can be exemplified. These can be used individually or in a mixture. Thereamong, nonionic surfactants are preferable in the point of not easily being influenced by other ionic ingredients. Furthermore, among nonionic surfactants, hydrophilic additives consisting of polyoxyethylene alkyl ethers that can be kneaded with the polyolefin resin serving as the base are preferable.

As the hydrophilic additive, those having the following structural formula are more preferable.

R1-(hydrophilic segment) (Formula 1)

In the above formula, R1 is a linear alkyl or branched alkyl having a carbon number of 10 to 100, and preferably has a carbon number from 22 to 40.

In addition, the hydrophilic segment preferably consists of units derived from ethylene oxide, propylene oxide, ethylene glycol, epichlorohydrin, acrylic acid, methacrylic acid, ethyleneimine, caprolactone, vinyl alcohol or vinyl acetate, or oligomer units, and is constituted by 2 to 10 of these units repeating.

More preferably, those having the following structural formula can be exemplified.

R1-(OCH$_2$CH$_2$)x-OH (Formula 2)

In the above formula, x is a number of 2 to 10. R1 is the same as the definition in the above formula 1.

Compounds of these structures can be used by mixing two or more types. In the case of using a mixture of two or more types of polyoxyethylene alkyl ethers, the average of the added number of the (OCH$_2$CH$_2$) group relative to the alkyl group R1 of the overall mixture is used as x. As an example, CH$_3$CH$_2$(CH$_2$CH$_2$)$_{13}$CH$_2$CH$_2$(OCH$_2$CH$_2$)$_{2.5}$OH can exemplified. In this case, the added number 2.5 of the ethyleneoxide is the average value arrived at by obtaining the added number of (OCH$_2$CH$_2$) by a known measurement method such as FT-IR with CH$_3$CH$_2$ (CH$_2$CH$_2$)$_{13}$CH$_2$CH$_2$ as a reference.

As specific examples of preferred hydrophilic additives, Techsurf (trade name) 15560 (manufactured by Techmer PM), Unithox (trade name) 480 (manufactured by Baker Hudges Inc.), and Unithox (trade name) 550 (manufactured by Baker Hudges Inc.) can be exemplified. Thereamong, those selected from the group consisting of Techsurf (trade name) 15560, Unithox (trade name) 480 and Unithox (trade name) 550 are particularly preferable.

The hydrophilic additive is kneaded in about 0.01 to about 10% by mass relative to the mass (solid content) of the polyolefin-based resin forming the porous support layer, preferably about 0.025 to about 5% by mass, and particularly preferably about 0.1 to about 3% by mass. The hydrophilicity granted by the hydrophilic additive is stable without harming the performance, even after continued time. Since it is possible to stabilize the gas permeability by the condensed water being naturally evacuated in the porous support layer having a comparatively small pore size of no more than 0.1 μm like the gas permeable membrane in particular, the addition of a hydrophilic additive is effective.

In the present specification, the hollow fiber membrane "having hydrophilicity" indicates a state of water or a dilute solution such as a saline solution or alcohol-containing aqueous solution saturating the hollow fiber membrane thereof or on the surface of the hollow fiber membrane. Materials drawing up the water or dilute aqueous solution can be classified as hydrophilic. The method for measuring hydrophilicity is by measuring the vertical suction ability thereof. In the present invention, in a case of exhibiting an ability having at least 2% water absorption rate in JIS K7209, it is defined as the "hollow fiber membrane is hydrophilic". The water absorption rate is more preferably at least 4%.

(Homogeneous Layer)

The composite hollow fiber membrane for degassing of the present invention has a non-porous homogeneous layer having gas permeability. In the present invention, the non-porous homogeneous layer having gas permeability is hydrophobic.

In the present specification, "permeates gas" or "gas-permeable" indicates a characteristic of only permeating gas without permeating liquids, etc.

In the present specification, "non-porous" indicates the matter of a solid in which there are no holes and the inside is filled by resin.

The non-porous homogeneous layer preferably consists of hydrophobic polymer. The hydrophobic polymer referred to herein indicates a polymer free of hydrophilic functional groups such as sulfone groups and hydroxyl groups in the repeating units, or blocks consisting of hydrophilic repeating units such as ethyleneoxide. The polymer used in the homogeneous layer (hereinafter abbreviated as polymer A) is preferably a polymer (polyolefin-based resin) obtained with olefin as a main constituent. It may be a polyolefin polymer obtained using only olefin, may be a polyolefin copolymer of olefin and another monomer, or may be a modified resin of these. As specific examples thereof, olefin block copolymer (OBC), low-density polyethylene (LDPE), linear low-density polyethylene (LLDPE), linear very-low-density polyethylene (VLDPE), reactor TPO, soft polymethylpentene, etc. can be exemplified.

Additives such as antioxidants, ultraviolet light absorbers, lubricants, anti-blocking agents, pigments and flame retardants may be added as necessary to the polyolefin-based resin constituting the homogeneous layer so long as in a range not harming the object of the present invention.

(Porous Support Layer)

The porous support layer is not particularly limited so long as being a material that has compatibility with the polymer constituting the non-porous homogeneous layer, and that can form a porous structure (hereinafter abbreviated as polymer B). The polymer B consists of polyolefin-based resin or contains polyolefin resin. The polyolefin-based resin is preferably contained in at least 50% by mass relative to the mass of the polymer B, more preferably at least 70% by mass, and even more preferably at least 90% by mass.

As the polyolefin-based resin, high-density polyethylene, or polypropylene, polymethylpentene, etc. are preferable.

In the present specification, "porous" indicates a state of 0.01 μm to 0.5 μm holes in average pore diameter being multiply arranged in a network form. However, the size of the pores in the porous support layer is not limited, and is adequate so long as a size at which sufficient gas permeability and mechanical strength are satisfied.

Porous media can be obtained by drawing with the drawing temperature T no higher than the Vicat softening point of the polymer B in the drawing process, as described later. The porosity of the porous support layer is preferably 30 to 80% by volume relative to 100% by volume of the overall porous support layer. If the porosity is at least 30% by volume, superior gas permeability tends to be obtained. If the porosity is no more than 80% by volume, the mechanical strength such as pressure resistance improves.

In addition, the polymer A and polymer B preferably agree in melt properties from the point of moldability; therefore, since the moldability improves with a smaller difference between the respective MFRs (Melt Flow Rate: evaluation method of fluidity of polymer by heating and pressurizing a fixed amount of synthetic resin in a cylindrical container heated with a heater to a prescribed temperature, and measuring the resin amount extruded per 10 minutes from an opening (nozzle) provided in a vessel bottom), it is preferable.

In addition, additives such as antioxidants, ultraviolet light absorbers, lubricants, anti-blocking agents, pigments and flame retardants may be added to the porous support layer as necessary so long as within a range not harming the object of the present invention.

(Composite Hollow Fiber Membrane and Production Method) Thereof

The composite hollow fiber membrane of the present invention can be obtained by way of a multi-layer composite spinning process and drawing pore formation process.

As the form of the composite membrane constituting the hollow fiber membrane, it may be a two-layer composite membrane of the non-porous homogeneous layer having gas permeability and the porous support layer, or may be a three-layer composite membrane in which the non-porous homogeneous layer having gas permeability is sandwiched by the porous support layers. It is particularly preferable to consist of a three or more layer composite membrane.

Position of the non-porous homogeneous layer having gas permeability in the three or more layer composite membrane is preferably arranged within a range of $\frac{1}{10}$ to $\frac{1}{3}$ from the inner side of the hollow fiber membrane. Upon manufacturing into a module, a potting resin impregnates from the outer circumferential direction of the membrane to produce an anchoring effect. Since the non-porous homogeneous layer is a non-porous structure, the potting resin will not impregnate inside therefrom, and thus it is possible to better prevent damage to the membrane from bending accompanying pressure fluctuations in the vicinity of the potting part as the region embedded by the potting resin increases. In addition, when setting the thickness of the support layer on the inner side of the non-porous homogeneous layer to a range of no more than $\frac{1}{10}$ of the membrane thickness, it is not preferable because, in the drawing process upon forming pores in the support layer polymer, defects arise by the non-porous homogeneous layer polymer being dragged to the support layer polymer of the inner layer on which it is adhering. In addition, when setting to the range of at least $\frac{1}{3}$, it is not preferable because the embedded region by the potting resin becomes small and receives the influence of bending and the like and is damaged.

Although the width of the present composite hollow fiber membrane is not particularly limited, the hollow fiber membrane outside diameter is preferably 100 to 2000 μm. If the hollow fiber membrane outside diameter is at least 100 μm, the gap between hollow fiber membranes during production of a hollow fiber membrane module will tend to be sufficiently acquired, whereby the potting resin will come to easily impregnate between hollow fiber membranes. If the hollow fiber membrane outside diameter is no more than 2000 μm, it will be possible to decrease the size of the module overall also when producing a hollow fiber membrane module using several hollow fiber membranes. Since the volume of the potting processed part also decreases thereby, a decline in the dimensional precision due to shrinking of the resin for potting during the potting process tends to be suppressed. The membrane thickness of the hollow fiber membrane is preferably 10 to 200 μm. If the thickness is at least 10 μm, the mechanical strength will improve. Furthermore, if the thickness is no more than 200 μm, it tends to suppress the fiber outside diameter of the present composite hollow fiber membrane from becoming too thick and the volumetric efficiency of the membrane upon building into a membrane module reducing.

The thickness of the homogenous layer is preferably 0.5 to 10 μm. When made thinner than 0.5 μm, it is not preferable because of tending to be influenced by pinholes from partial pore formation at the melt boundary with the porous support layer, and the decline in pressure resistance from thinning being remarkable. At 10 μm or more it is not preferable since the decline in gas permeability due to thickening is remarkable and the performance as a gas-permeable membrane cannot be sufficiently extracted.

The present composite hollow fiber membrane can be produced by way of a method including, for example, the below-mentioned 1) spinning process and 2) drawing process.

1) Spinning process: For example, if the present composite hollow fiber membrane of a three-layer structure, a composite nozzle spinneret is used in which the outermost layer nozzle part, intermediate layer nozzle part and innermost layer nozzle part are arranged concentrically. The polymer B is supplied in the molten state to the outermost layer nozzle part and innermost layer nozzle part, and the polymer A is supplied in the molten state to the intermediate layer nozzle part. Then, the polymer A and polymer B are extruded from each of these nozzle parts, and cooled to solidify in an undrawn state while appropriately adjusting the extrusion speed and winding speed. A hollow fiber membrane precursor is obtained having a three-layer structure in which the undrawn homogeneous layer precursor is sandwiched by two undrawn porous support layer precursors, which are in non-porous form.

The discharge temperature of the polymer A and polymer B is adequate so long as being a state in which these can sufficient melt and be spun.

2) Drawing process: The undrawn hollow fiber membrane precursor obtained by melt spinning is preferably fixed-length heat treated (annealed) prior to drawing at the melting point or lower.

Fixed-length heat treatment is preferably performed at 105 to 140° C. for 8 to 16 hours with polyethylene. If the temperature is at least 105° C., the present composite hollow fiber membrane of favorable quality tends to be obtained. If the temperature is no higher than 120° C., sufficient elasticity tends to be obtained, the stability during drawing improves, and drawing at a high scaling factor becomes easy. In addition, if the treatment time is at least 8 hours, the present composite hollow fiber membrane of favorable quality tends to be obtained.

The hollow fiber membrane precursor is drawn at conditions satisfying the below requirements of (i) and (ii).

(i) The relationship between the drawing temperature T (° C.) and melting point Tm (° C.) of the polymer A is $Tm-20 \leq T \leq Tm+40$.

(ii) The drawing temperature T is no higher than the Vicat softening point of the polymer B.

If the drawing temperature T is at least Tm−20 (° C.), pore forming in the porous support layer precursor becomes easy, and the present composite hollow fiber membrane having superior gas permeability tends to be obtained. If the drawing temperature T is no higher than Tm+40 (° C.), defects such as pinholes by disorder arising in molecules tends to be suppressed from occurring.

In addition, if the drawing temperature T is no higher than the Vicat softening point of the polymer B, pore forming in the porous support layer precursor becomes easy, and the present composite hollow fiber membrane having superior gas permeability tends to be obtained.

The drawing process preferably performs cold drawing prior to drawing performed at the drawing temperature T (hot drawing). In other words, two-stage drawing that performs hot drawing in succession to cold drawing, or multi-stage drawing that, in succession to cold drawing, performs hot drawing by dividing into multiple-stages of at least two stages is preferable.

Cold drawing is drawing that causes a structural collapse of the membrane at a comparatively low temperature, thereby causing micro cracking to occur. For the temperature of cold drawing, it is preferably carried out at a comparatively low temperature within a range from 0° C. to a temperature lower than Tm−20° C.

In drawing, low-speed drawing is preferable. If low-speed drawing, pore forming while suppressing the fiber diameter from becoming too fine during drawing becomes easy.

With the overall hollow fiber membrane as 100%, the porosity of the overall hollow fiber membrane is more preferable if at least 30% from the viewpoint of gas permeability, and more preferable if no more than 55% from the viewpoint of strength retention.

The draw ratio differs depending on the types of polymer A and polymer B used; however, the final ratio (total draw ratio) relative to the undrawn hollow fiber membrane precursor is preferably set to 2 to 5 times. If the total draw ratio is at least 2 times, the porosity of the porous support layer will improve, and superior gas permeability will tend to be obtained. If the total draw ratio is no more than 5 times, the rupture elongation of the present composite hollow fiber membrane will improve.

Furthermore, due to improving the dimensional stability of the hollow fiber membrane obtained from the drawing, it is preferable to perform heat setting under defined length conditions or in a state in which the porous hollow fiber membrane is slightly relaxed within a range of no more than 40%.

In order to effectively perform heat setting, the heat setting temperature is preferably at least the drawing temperature and no higher than the melting point temperature.

The present composite hollow fiber membrane explained in the foregoing has a non-porous homogeneous layer formed from the polymer A and a porous support layer formed from the polymer B; therefore, it possesses both superior solvent resistance and gas permeability. In addition, it also has superior low elution properties.

(Hollow Fiber Membrane Module)

The hollow fiber membrane module of the present invention is a module equipped with the aforementioned present composite hollow fiber membrane. The hollow fiber membrane module of the present invention employs the same form as a conventional hollow fiber membrane module, except for using the present composite hollow fiber membrane. For example, a hollow fiber membrane module of a conventional form that is prepared by bundling several hundred of the present composite hollow fiber membranes and inserting into a cylindrical housing, then sealing these present composite hollow fiber membranes with a sealing material (potting resin) can be exemplified.

In addition, the packing ratio of hollow fiber membranes relative to the potting processed part volume is preferably on the order of 20 to 60%.

As a degassing method using a composite hollow fiber membrane of the present invention, a raw solution containing dissolved gas is supplied to the inner side (primary side) of the hollow fiber membrane, the outer side (secondary side) of the hollow fiber membrane is made reduced pressure to cause the dissolved gas to permeate the membrane by way of the driving force proportional to the partial pressure difference of the dissolved gas, whereby the dissolved gas can be exhausted to the outer side of the hollow fiber membrane. In addition, the outer side of the hollow fiber membrane can conversely be defined as the primary side, and the inner side of the hollow fiber membrane defined as the secondary side. Furthermore, it is possible to degas a target chemical solution to a predetermined degassed level by connecting a plurality of the hollow fiber membrane modules in series, and degassing of a large amount of a chemical solution can be performed by connecting a plurality thereof in parallel.

EXAMPLES

Hereinafter, the present invention will be explained in further detail based on the Examples. It should be noted that each property was measured according to the following methods.

[Melting Point (Tm)]

In the measurement of the melting point (Tm), a differential scanning calorimeter manufactured by Seiko Instruments Inc. was used. More specifically, the melting point was obtained from the melting peak temperature and melting completion temperature, when melting about 5 mg of sample for 5 minutes at 200° C., then cooling at a rate of 10° C./min to 40° C. to crystallize, followed by further heating at 10° C./min to 200° C.

[Melt Flow Rate (MFR)]

Following the E conditions of ASTM D1238, the melt flow rate (MFR2.16) (g/10 min) was obtained by measuring the mass of resin extruded into a strand in 10 minutes with a load of 2.16 kg at 190° C.

[Density]

In conformance with JIS K7112, a sample produced by heat treating for 1 hour at 100° C. the strand obtained during MFR measurement with a 2.16 kg load at 190° C., then cooling to room temperature over 1 hour was measured using a density gradient tube.

[Water Absorption]

The water saturation amount was measured when immersing in distilled water for 24 hours at 23° C. in conformance with method A of JIS K7209 (Plastics—Determination of water absorption).

Example 1

A low-density polyethylene produced from a metallocene catalyst (trade name "Harmolex NF324A" manufactured by Nippon Polyethylene Corp., MFR: 1.0 g/10 min, density: 0.906 g/cm$^3$, melting point Tm: 120° C., Mw/Mn=3.0) was used as the polymer A (for homogeneous layer formation).

In the porous support layer (inner layer and outer layer), high-density polyethylene (trade name Suntec HD B161, MFR 1.35 g/10 min, density 0.963 g/cm$^3$, melting point 130° C.) compounded in advance with 2% by mass of a hydrophilic additive Techsurf (trade name) 15560 manufactured by BASF (aqueous solution containing 60% by weight of polyoxyethylene alkyl ether: $CH_3CH_2$ $(CH_2CH_2)_{13}$ $CH_2CH_2$ $(OCH_2CH_2)_{2.5}OH$) was used.

A composite nozzle spinneret was used in which the outermost layer nozzle part, intermediate layer nozzle part and innermost layer nozzle part are concentrically arranged. An undrawn hollow fiber membrane precursor was obtained by supplying the polymer B in a molten state to the outermost layer nozzle part and innermost layer nozzle part, supplying the polymer A in a molten state to the intermediate layer nozzle part, ejecting so as to make polymer A from the outermost layer/polymer B/polymer A in the ratio of 12/1/2, and spinning these polyethylenes at a winding rate of 135 m/min. In this hollow fiber membrane precursor, three layers in which a homogeneous layer precursor was sandwiched by two porous support layer precursors were arranged concentrically.

This undrawn hollow fiber was annealed at 108° C. Next, a composite hollow fiber membrane was obtained by drawing 1.25 times at 23+/−2° C., successively performing drawing at 4.4 times in a heating oven at 70° C., implementing a relaxation process of 0.4 times in the heating oven at 100° C. and performing hot drawing until the total drawing rate became 4 times by molding so that the final total draw ratio became 4 times. This multi-layer composite hollow fiber membrane was a three-layer structure in which the homogeneous layer (non-porous thin film) was sandwiched by two porous support layers.

Drawing Process:

The hollow fiber membrane precursor was annealed for 8 hours at 108° C. Next, by drawing 1.25 times at 23+/−2° C., and successively performing hot drawing until the total drawing rate became 4.4 times in a heating oven at 100° C., pores were formed in the two porous support layer precursors. Subsequently, a gas-permeable composite hollow fiber membrane was obtained by providing a relaxation process of 0.4 times in a heating oven at 100° C., and molding so that the final total draw ratio (ratio relative to undrawn hollow-fiber membrane precursor) became 4 times. The prepared composite hollow fiber membrane had an inside diameter of 161 μm, outside diameter of 263 μm and membrane thickness of 49.4 μm, and the non-porous homogeneous layer was at a position about ⅛ of the membrane thickness from the inner side.

This gas-permeable composite hollow fiber membrane was a three-layer structure in which the homogeneous layer was sandwiched by two porous support layers. In addition, the porosity of this gas-permeable composite hollow fiber membrane was 64.5% by volume with the overall composite hollow fiber membrane as 100% by volume.

Upon measuring the air permeation rate of the composite hollow fiber membrane, the oxygen permeation rate ($Q_{O2}$) at room temperature (25° C.) was 0.10 m/hr·Mpa, the nitrogen permeation rate ($Q_{N2}$) was 0.035 m/hr·Mpa, and the separation factor ($Q_{O2}/Q_{N2}$) was 2.8. Leaks did not occur even when dipping in isopropyl alcohol (IPA) since the separation factor of 2.8 of the polymer used in the thin film layer was preserved.

Upon measuring the water absorption, the hydrophilicity was kept high at 5.7%.

Furthermore, a hollow fiber membrane module was prepared using the prepared gas-permeable composite hollow fiber membrane. It was operated by configuring so as to flow water at 30° C. on the inner side of the hollow fiber membrane and blow carbon dioxide from the outer side of the hollow fiber membrane to produce carbonated water. The penetration of water believed to be condensed water was confirmed after three months. Stable operation was possible without the dissolved carbon dioxide gas concentration declining even when condensed water was produced.

Example 2

As the polymer supplied to the innermost layer and outermost layer of a three-layer composite nozzle (both porous support layers), homopolypropylene (trade name: FY6H, manufactured by Nippon Polypropylene) compounding in advance with 2% by mass of the hydrophilic additive Techsurf (trade name) 15560 was used.

In addition, finely dispersed structure polymer composition (trade name: Zeras #7025, manufactured by Mitsubishi Chemical Corp.) made by multi-stage polymerization, containing 80% by mass of particulates consisting of ethylene-propylene co-polymer with a particle size of about 0.1 μm to 0.2 μm, and having a sea-island structure in which these particles are dispersed uniformly in polypropylene was used as the polymer raw material supplied to the intermediate layer of this nozzle (non-porous homogeneous layer). Using these, melt spinning was performed at a discharge opening temperature of 220° C. and winding speed of 180 m/min. It was carried out with the discharge ratio similar to Example 1.

The obtained hollow fiber was annealed for 10 minutes at 140° C., drawing with a total draw ratio of 120% was consecutively performed at room temperature (23+/−2° C.), hot drawing was successively performed until the total draw ratio became 340% in a heating oven heated to 120° C., and relaxation heat setting was further performed so that the total draw ratio became 300% in a heating over heated to 130° C.

As a result of evaluating the membrane performance of the composite hollow fiber membrane obtained in this way, the porosity of the overall hollow fiber membrane was 27% by volume with the overall hollow fiber membrane as 100% by volume, the inside diameter was 125 μm, the membrane total thickness was 26 μm and the membrane thickness of the intermediate layer was 1 μm. The non-porous homogeneous layer was at a position about ⅛ of the membrane thickness from the inner side.

Upon observing with a scanning electron microscope (SEM), pores with a pore diameter of about 0.01 μm were densely present at the entire surface on the inner and outer surface (porous support layer), and pores were not observed in the intermediate layer portion (homogeneous layer).

Upon measuring the air permeation rate of the three-layer composite hollow fiber membrane, the oxygen permeation rate ($Q_{O2}$) at room temperature (20° C.) was 0.034 m/hr·Mpa, the nitrogen permeation rate ($Q_{N2}$) was 0.008 m/hr·Mpa, and the separation factor ($Q_{O2}/Q_{N2}$) was 4.2.

Upon measuring the water absorption, the hydrophilicity was kept high at 6.5%.

Furthermore, a hollow fiber membrane module was prepared using the prepared gas-permeable composite hollow fiber membrane. It was operated by configuring so as to flow water at 30° C. on the inner side of the hollow fiber membrane and blow carbon dioxide from the outer side of the hollow fiber membrane to produce carbonated water. The penetration of water believed to be condensed water was confirmed after three months. Stable operation was possible without the dissolved carbon dioxide gas concentration declining even when condensed water was produced.

Comparative Example

It was carried out similarly to Example 1, except for only using the high-density polyethylene Suntec B161 (MFR 1.35 g/10 min, density 0.963 g/cm³, melting point 130° C.) without adding hydrophilic additive to the polymer used in the support layer.

As a result of evaluating the membrane performance of the composite hollow fiber membrane obtained in this way, the non-porous homogeneous layer was at a position about ⅛ of the membrane thickness from the inner side.

Upon observing with a scanning electron microscope (SEM), pores with a pore diameter of about 0.01 μm were densely present at the entire surface on the inner and outer surface (porous support layer), and pores were not observed in the intermediate layer portion (homogeneous layer).

Upon measuring the air permeation rate of the composite hollow fiber membrane, the oxygen permeation rate ($Q_{O2}$) at room temperature (23+/−2° C.) was 0.11 m/hr·Mpa, the nitrogen permeation rate ($Q_{N2}$) was 0.039 m/hr·Mpa, and the separation factor ($Q_{O2}/Q_{N2}$) was 2.8. Leaks did not occur even when dipping in isopropyl alcohol (IPA) since the separation factor of 2.8 of the polymer used in the thin film layer was preserved.

Upon measuring the water absorption, the hydrophobicity was high at 0.3%.

Furthermore, a hollow fiber membrane module was prepared using the prepared gas-permeable composite hollow fiber membrane. It was operated by configuring so as to flow water at 30° C. on the inner side of the hollow fiber membrane and blow carbon dioxide from the outer side of the hollow fiber membrane to produce carbonated water. The penetration of water believed to be condensed water was confirmed after three months. The dissolved carbon dioxide gas concentration started to gradually decline from immediately prior to addition of condensed water, and declined to no more than 50% the initial.

INDUSTRIAL APPLICABILITY

The gas-permeable composite hollow fiber membrane of the present invention is very useful in carbon dioxide dissolution for carbonated water production and carbonate spring, and in the degassing and gas dissolution of a target liquid containing water vapor or with water as a main component, such as in the separation of methane gas from biogas.

The invention claimed is:

1. A composite hollow fiber membrane comprising a hydrophobic non-porous homogeneous layer having gas permeability and a hydrophilic porous support layer, wherein:
   the hydrophilic porous support layer supports the hydrophobic non-porous homogeneous layer,
   the hydrophilic porous support layer is constituted by a polyolefin-based resin composition that comprises a polyolefin-based resin and a hydrophilic additive that is dispersed throughout said polyolefin-based resins,
   the hydrophilic additive consists of one or more nonionic surfactants, and
   the content of the hydrophilic additive in the polyolefin-based resin composition is 0.01 to 10% by mass relative to the mass of polyolefin-based resin.

2. The composite hollow fiber membrane according to claim 1, wherein water absorption is at least 2% according to JIS K7209 test method.

3. The composite hollow fiber membrane according to claim 1, wherein the hydrophilic additive is polyoxyethylene alkyl ether.

4. The composite hollow fiber membrane according to claim 1, wherein the hydrophilic additive is represented by the formula R1-(OCH$_2$CH$_2$)x-OH, wherein R1 is a linear or branched alkyl having a carbon number of 10 to 100, and x is 2 to 10.

5. The composite hollow fiber membrane according to claim 1, wherein the content of the hydrophilic additive in the polyolefin-based resin composition is 0.025 to 5% by mass relative to the mass of polyolefin-based resin.

6. The composite hollow fiber membrane according to claim 1, wherein the composite hollow fiber membrane is a three-layer composite membrane comprising said non-porous homogeneous layer having gas permeability and two of said hydrophilic porous support layers in which the non-porous homogeneous layer having gas permeability is sandwiched by the hydrophilic porous support layers.

7. The composite hollow fiber membrane according to claim 6,
wherein the hydrophilic additive is polyoxyethylene alkyl ether.

8. The composite hollow fiber membrane according to claim 1, wherein the polyolefin-based resin composition further comprises at least one selected from the group consisting of antioxidants, ultraviolet light absorbers, lubricants, anti-blocking agents, pigments, and flame retardants.

9. The composite hollow fiber membrane according to claim 1, wherein said polyolefin-based resin is at least one of high density polyethylene, polypropylene and polymethylpentene.

10. The composite hollow fiber membrane according to claim 1, wherein said polyolefin-based resin composition is prepared by kneading the polyolefin-based resin and the hydrophilic additive together such that the hydrophilic additive is dispersed throughout said polyolefin-based resin.

11. The composite hollow fiber membrane according to claim 1, wherein said polyolefin-based resin composition is prepared by compounding the polyolefin-based resin and the hydrophilic additive together such that the hydrophilic additive is dispersed throughout said polyolefin-based resin.

* * * * *